(12) United States Patent
O'Hara et al.

(10) Patent No.: US 11,601,456 B2
(45) Date of Patent: Mar. 7, 2023

(54) TRANSPARENT INSPECTION OF TRAFFIC ENCRYPTED WITH PERFECT FORWARD SECRECY (PFS)

(71) Applicant: Arbor Networks, Inc., Westford, MA (US)

(72) Inventors: Sean O'Hara, Ypsilanti, MI (US); Archana A. Rajaram, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 283 days.

(21) Appl. No.: 16/990,098

(22) Filed: Aug. 11, 2020

(65) Prior Publication Data
US 2021/0360011 A1    Nov. 18, 2021

Related U.S. Application Data

(60) Provisional application No. 63/026,216, filed on May 18, 2020.

(51) Int. Cl.
*H04L 29/06* (2006.01)
*H04L 9/40* (2022.01)

(52) U.S. Cl.
CPC ...... *H04L 63/1425* (2013.01); *H04L 63/0428* (2013.01); *H04L 63/166* (2013.01)

(58) Field of Classification Search
CPC ............. H04L 63/1425; H04L 63/0428; H04L 63/166; H04L 63/02; H04L 63/04
See application file for complete search history.

(56) References Cited

U.S. PATENT DOCUMENTS

| 8,165,088 B2 * | 4/2012 | Oba ........................ H04L 69/28 455/436 |
| 8,266,266 B2 * | 9/2012 | Short .................. H04L 41/0896 709/227 |

(Continued)

OTHER PUBLICATIONS

Kang, Namhi, et al. "ESSE: efficient secure session establishment for internet-integrated wireless sensor networks." International Journal of Distributed Sensor Networks 11.8 (2015): 393754. (Year: 2015).*

*Primary Examiner* — Joseph P Hirl
*Assistant Examiner* — Ka Shan Choy
(74) *Attorney, Agent, or Firm* — Locke Lord LLP; Scott D. Wofsy; Christopher J. Capelli

(57) ABSTRACT

A method is provided for inspecting network traffic. The method, performed in a single contained device, includes receiving network traffic inbound from an external host that is external to the protected network flowing to a protected host of the protected network, wherein the network traffic is transported by a secure protocol that implements ephemeral keys that endure for a limited time. The method further includes performing a first transmission control protocol (TCP) handshake with the external host, obtaining source and destination data during the first TCP handshake, the source and destination data including source and destination link and internet addresses obtained, caching the source and destination data, and using the cached source and destination data to obtain a Layer-7 request from the external host to the protected host and to pass a Layer-7 response from the protected host to the external host.

15 Claims, 6 Drawing Sheets

(56) References Cited

U.S. PATENT DOCUMENTS

| | | | |
|---|---|---|---|
| 8,650,495 B2* | 2/2014 | Ong | G06F 16/9535 |
| | | | 715/741 |
| 9,967,292 B1* | 5/2018 | Higgins | H04L 63/30 |
| 2014/0157405 A1* | 6/2014 | Joli | H04L 63/1425 |
| | | | 726/22 |
| 2019/0229923 A1* | 7/2019 | Airamo | H04L 9/3226 |
| 2021/0111881 A1* | 4/2021 | Migault | H04L 63/10 |

* cited by examiner

TRANSPARENT INSPECTION OF TRAFFIC ENCRYPTED WITH PERFECT FORWARD SECRECY (PFS)

CROSS REFERENCE TO RELATED APPLICATIONS

This application claims priority to U.S. Patent Application Ser. No. 63/026,216 filed May 18, 2020, which is incorporated herein by reference in its entirety.

FIELD OF THE DISCLOSURE

The disclosed embodiments generally relate to computer network protection, and more particularly, to a system and method for transparent inspection of traffic encrypted with perfect forward secrecy.

BACKGROUND OF THE DISCLOSURE

With the wide-spread adoption of Perfect Forward Secrecy (PFS) in recent versions of transport layer security (TLS), many tools and services can no longer rely on passive decryption of network traffic for information about contents of the traffic. There are several solutions that attempt to address this issue, however some risks that can result from available solutions include traffic being transmitted through a protected network unencrypted, exposure of a TLS terminator to an external network and Layer-3 (of the Open Systems Interconnection model (OSI model) or an equivalent to Layer-3 of a different model) distributed denial of service (DDOS) attacks, vulnerability to potential attack vectors when using a Magic MAC address used by members of a same cluster (wherein the vulnerability arises from a potentially spoofed MAC addresses by a malicious actor), exposure of encryption keys to the external network, and a need for applications to compile or link with a custom library to decrypt traffic.

Conventional methods and systems for inspection of traffic encrypted with perfect forward secrecy have generally been considered satisfactory for their intended purpose. However, there is still a need in the art to provide improved inspection of traffic encrypted with perfect forward secrecy that reduces associated risks.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of A method is provided for inspecting network traffic. The method, performed in a single contained device, includes receiving network traffic inbound from an external host that is external to the protected network flowing to a protected host of the protected network, wherein the network traffic is transported by a secure protocol that implements ephemeral keys that endure for a limited time. The method further includes performing a first transmission control protocol (TCP) handshake with the external host, obtaining source and destination data during the first TCP handshake, the source and destination data including source and destination link and Internet addresses obtained, caching the source and destination data, and using the cached source and destination data to obtain a Layer-7 request from the external host to the protected host and to pass a Layer-7 response from the protected host to the external host.

In one or more embodiments, the method can further include, performed in the single contained device, performing a first transport layer security (TLS) handshake with the external host, validating a Layer-7 request obtained after completing the first TLS, buffering the Layer-7 request, performing a second TCP handshake with the protected host, performing a second TLS handshake with the protected host, contingent on validation of the Layer-7 request, sending the buffered Layer-7 request to the protected host, receiving the Layer-7 response to the Layer-7 request from the protected host, and passing the Layer-7 response to the external host. The cached source and destination data can be used for at least one of performing the first TLS handshake, performing the second TCP handshake, performing the second TLS handshake, sending the buffered Layer-7 request, receiving the Layer-7 response, and passing the Layer-7 response.

In one or more embodiments, the method can further include inspecting a packet of the inbound network traffic by a Layer-3 inspection before performing the first TCP handshake.

In one or more embodiments, caching the source and destination data can include using the source and destination addresses of an incoming TCP-ACK packet of the TCP handshake.

In one or more embodiments, the source and destination addresses of the incoming TCP-ACK packet can be cached only if the incoming TCP ACK packet was received within a threshold amount of time of receiving an incoming TCP SYN packet of the TCP handshake.

In one or more embodiments, the first TCP handshake can be only completed when the packet passes the Layer-3 inspection.

In one or more embodiments, at least one of buffering the Layer-7 request, performing the second TCP handshake, and performing the second TLS handshake can be only initiated when the Layer-7 request passes the Layer-7 inspection.

In accordance with further aspects of the disclosure, at least one processor in a single contained device is provided that performs the disclosed method. In accordance with still further aspects of the disclosure a non-transitory computer readable storage medium and one or more computer programs embedded therein is provided, which when executed by at least one processor in a single contained device, cause the at least one processor to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
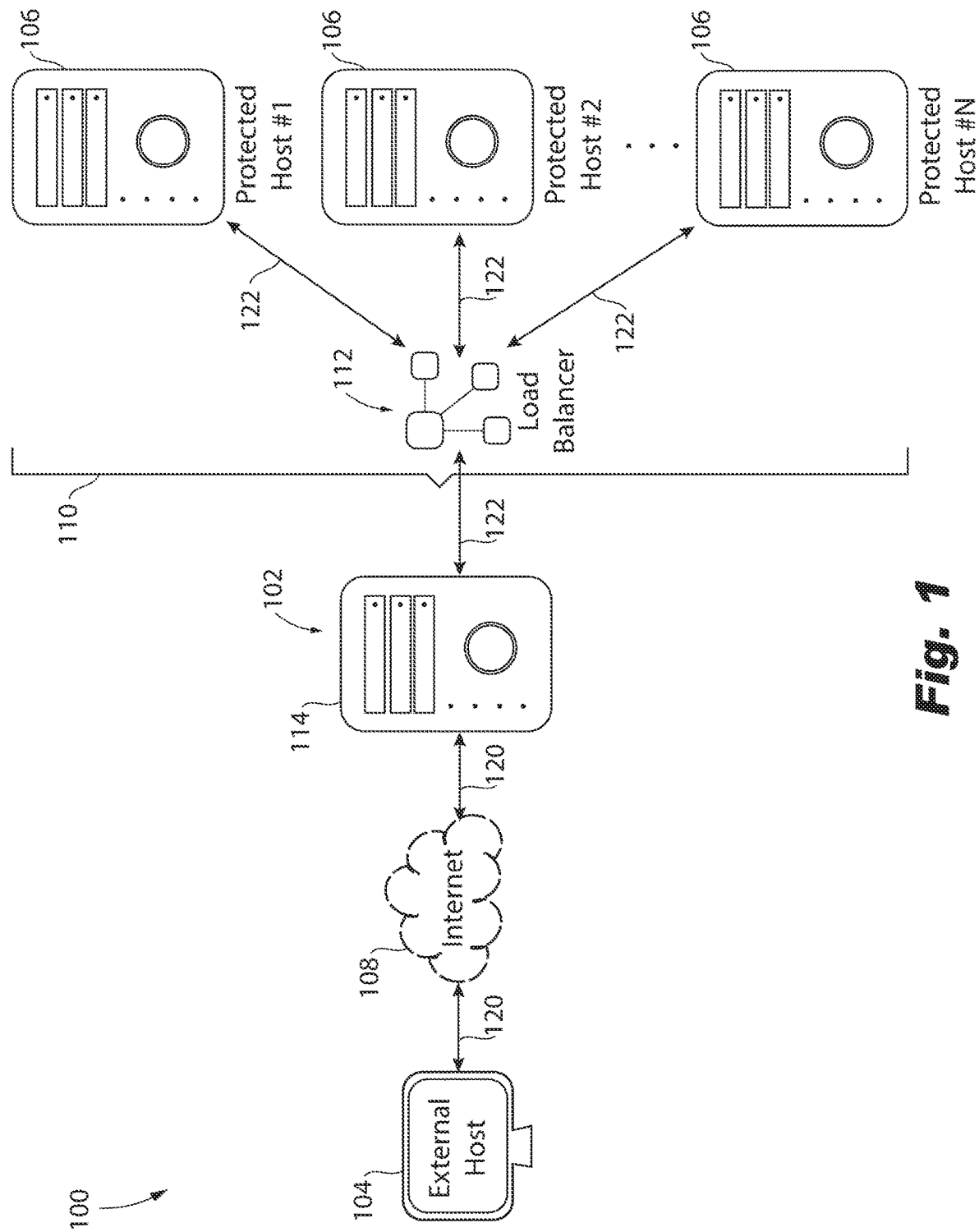
FIG. 1 illustrates a block diagram of an example network system having an inspection device for inspecting network traffic encrypted with perfect forward secrecy (PFS) in accordance with one or more embodiments of the disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-5, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the network system 100 is provided, wherein network system 100 includes an inspection device 102 that monitors network traffic flowing between external hosts 104 via and protected hosts 106 of a protected network 110. Inspection device 102 can monitor one or more external communication links 120 and can further communicate with the external network 108 via communication links 120. Similarly, inspection device 102 can monitor one or more internal communication links 122 and can further communicate with the protected network 110 via internal communication links 122. Internal communication links 122 can link to a network device 112 of the protected network, such as a load balancer or can link directly with the protected hosts 106. External and internal communication links 120 and 122 can include one or more wired and/or wireless communication links.

Inspection device 102 performs PFS inspection, operating as a bump-in-the-wire (BITW) device that does not have an IP address and allows Internet traffic to pass in either direction between while transparent to the protected hosts 106 and the external hosts 104. Focusing on network traffic entering the protected network 110 from an external host 104 and directed to a protected host 106, inspection device 102 performs transmission control protocol (TCP) handshaking and TLS handshaking with the external host 104 followed by obtaining a Layer-7 request, wherein Layer-7 refers to Layer-7 of the model or an equivalent to Layer-7 of a different model. An example of a Layer-7 request is a hypertext transport protocol (HTTP) request or requests that use protocols such as BITCOIN™, Rlogin™, session initiation protocol (SIP), simple mail transfer protocol (SMTP), and simple network time protocol (SNTP). DDoS attacks can also use Layer-7 requests.

To protect from an attack that uses Layer-7, inspection device 102 inspects the Layer-7 requests, and if the inspection is passed, performs TCP handshaking and transport layer security (TLS) handshaking with the protected host 106 before passing the Layer-7 request to the protected host 106. Upon receiving a Layer-7 response to the Layer-7 request, inspection device 102 passes the response to the external host 104. Inspection device 102 is a single contained device that performs the TCP handshaking, TLS handshaking (with both the external host 104 and the protected host), receives and passes the Layer-7 request and response, and performs Layer-7 inspection. This process is performed in the inspection device 102, as a single contained device, without using a separate device as proxy. The term "a single contained device" refers to a device in which all of its components are integrated so that all communication links between the components are internal to the single contained device and not accessible by an external device. In embodiments, all components of the single contained device are housed within a housing 114.

Protected devices 106 and external devices 104 are computing devices having hardware, software and/or firmware, such as servers, laptop devices, mobile devices (e.g., laptops, smartphones, cell phones, and tablets), network elements (e.g., routers, switches, and firewalls), embedded computer devices that are embedded in other devices (e.g., appliances, tools, vehicles, or consumer electronics). The protected devices 108 can communicate via the protected network 110 with one another and/or with the external network 108.

The protected network 110 and external network 108 can include one or more networks, such as an intranet, a local area network (LAN), and/or a wide area network (WAN). In examples, the protected network 110 can be an enterprise network, such as a school network, business network, and government network, to list a few examples, that can connect to the Internet. The external network 108 is external to protected network 110 and can be included in the Internet.

With regards to protection of protected network 110, in embodiments, the inspection device 102 can be located between the external network 108 and the protected network 110. In other embodiments, the inspection device 102 is located within protected network 110. In other embodiments, inspection device 102 can be located at a network edge (inside or outside of protected network 110) or deeper within protected network 110. In the embodiment shown, inspection device 102 is external to, but at an edge of, the protected network 110, and communicates with load balancer 112, which communicates with protected hosts 106.

Figure 2A:
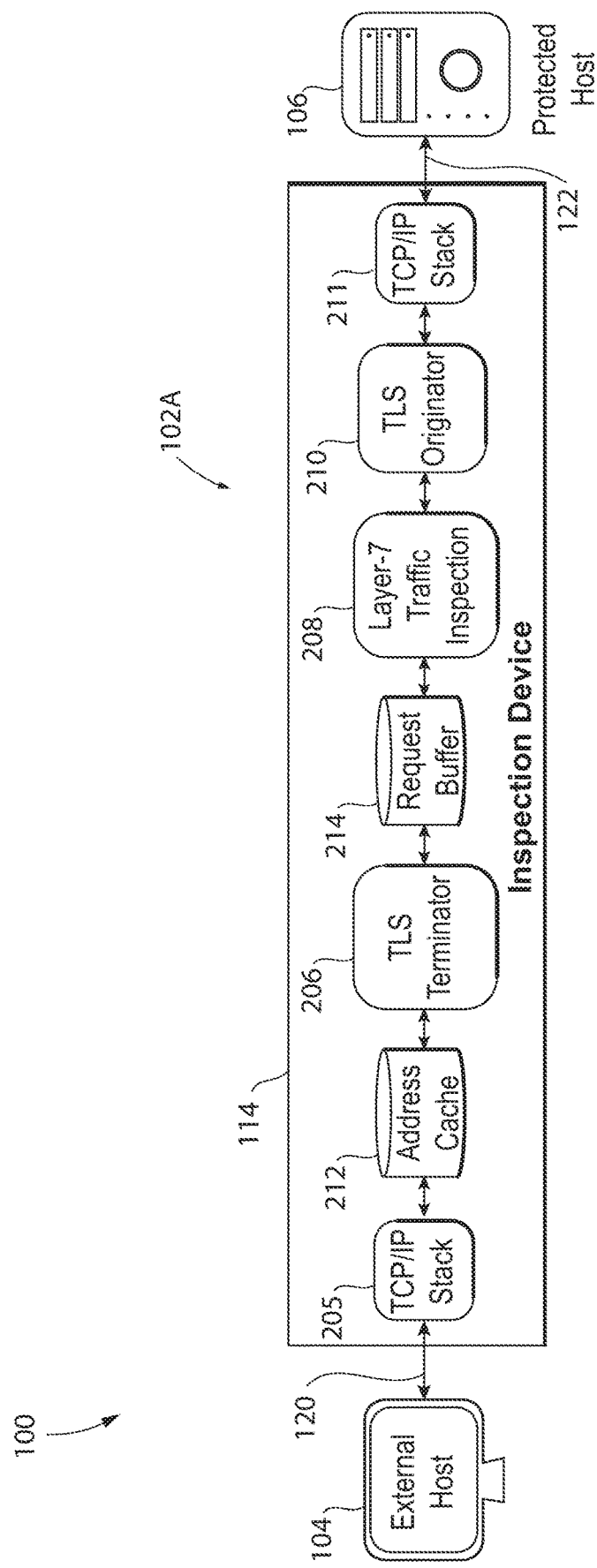
FIG. 2A illustrates a block diagram of the inspection device in accordance with one or more embodiments of the disclosure.

With reference to FIG. 2A, a block diagram of network system 100 is shown with inspection device 102A, wherein inspection device 102A includes the structure and function of inspection device 102 in accordance with one or more embodiments of the disclosure. The external hosts 104, external network 108, protected hosts 106, protected network 110, external communication links 120, and internal communication links 122 are functionally and structurally similar to the description provided with respect to FIG. 1, and is not repeated here for the sake of brevity.

Inspection device 102A includes components, including a first TCP/IP stack 205, a TLS terminator 206, a Layer-7 traffic inspector 208, a TLS originator 210, a second TCP/IP stack 211, an address cache 212, and a request buffer 214, which operate together to provide a routing solution for inspection device 102A.

Inspection device 102A, similar to inspection device 102, is an integrated single device provided as a BITW device that does not have an IP address. By their very nature, BITW systems are not Layer-3 routable since they do not have an IP address. While BITW systems have many advantages, such as reducing network attack surface, BITW systems are generally incompatible with proxy technology, since proxying requires traffic be routed to and from both clients and servers. At the heart of a solution for this routing issue is the ability to know the link layer (e.g., media access control (MAC)) address and internet layer (e.g., internet protocol (IP)) address of a client and/or server. Non-BITW systems query for this information from the operating system (OS), and the OS in turn queries for this information from its routing table and address cache, which is populated using an address resolution protocol (ARP). Since BITW systems have no internet address, there is no way for ARP responses to be routed back to the BITW system.

In accordance with the present disclosure, a solution to this issue is to populate an address cache using information obtained during TCP handshakes. Inspection device 102A populates address cache 212 using source and destination data including source and destination link and internet addresses obtained during a TCP handshake with the external host 104, as described in greater detail below.

Each of the components can be configured as individual processing devices and/or software components, or can be fully or partially integrated with one another, wherein integration includes sharing one or more hardware and/or software components. The address cache 212 can be, for example, a least recently used (LRU) cache. Request buffer 214 can be a chunk of memory (e.g., system memory 528 shown in FIG. 5 that is designated for storing a Layer 7 request).

First TCP/IP stack 205 performs TCP handshaking (e.g., a three-way handshake) with an external host 104, obtains source and destination data during the TCP handshake, and caches the source and destination data in address cache 212. The source and destination data is obtained during a first TCP handshake packet (TCP SYN) of the TCP handshake. The source and destination data includes source and destination link and Internet addresses obtained during the TCP handshake with the external host 104.

The cached data can be used by the inspection device 102 to enable inspection device 102 to perform as a BITW device, but still obtain the address information needed to route requests and responses between the external host 106 and the protected host 104. More specifically, inspection device 102 uses the cached data for at least one of performing TLS handshake with the external host 104, performing a second TCP handshake with the protected host 106, performing a second TLS handshake with the protected host 106, sending a Layer-7 request (after buffering) to the protected host 106, receiving a Layer-7 response from the protected host 106, and passing the Layer-7 response to the external host 104.

After the TCP handshake, TLS terminator 206 performs TLS handshaking and termination with the external host 104, during which the TLS terminator 206 receives and decrypts a Layer-7 request from the external host 104. Layer-7 traffic inspector 208 inspects the decrypted Layer-7 request. Inspection of the Layer-7 request can include, for example, using HTTP URL patterns (e.g., regular expressions) and/or HTTP header/payload patterns (e.g., regular expressions) to detect non-legitimate or malicious Layer-7 requests. Layer-7 requests that fail inspection are dropped, wherein as Layer-7 requests that pass inspection are buffered in request buffer 214.

TCP/IP Stack 211 performs a TCP handshake (e.g., a TCP three-way handshake) with the protected host 106. TLS originator 210 performs a TLS handshake with the protected host 106. Once the TLS handshake succeeds, TLS originator 210 sends the buffered Layer-7 request to the protected host 106. TLS originator 210 receives Layer-7 response from the protected host 106 and passes the Layer-7 response back to the external host 104.

Figure 2B:
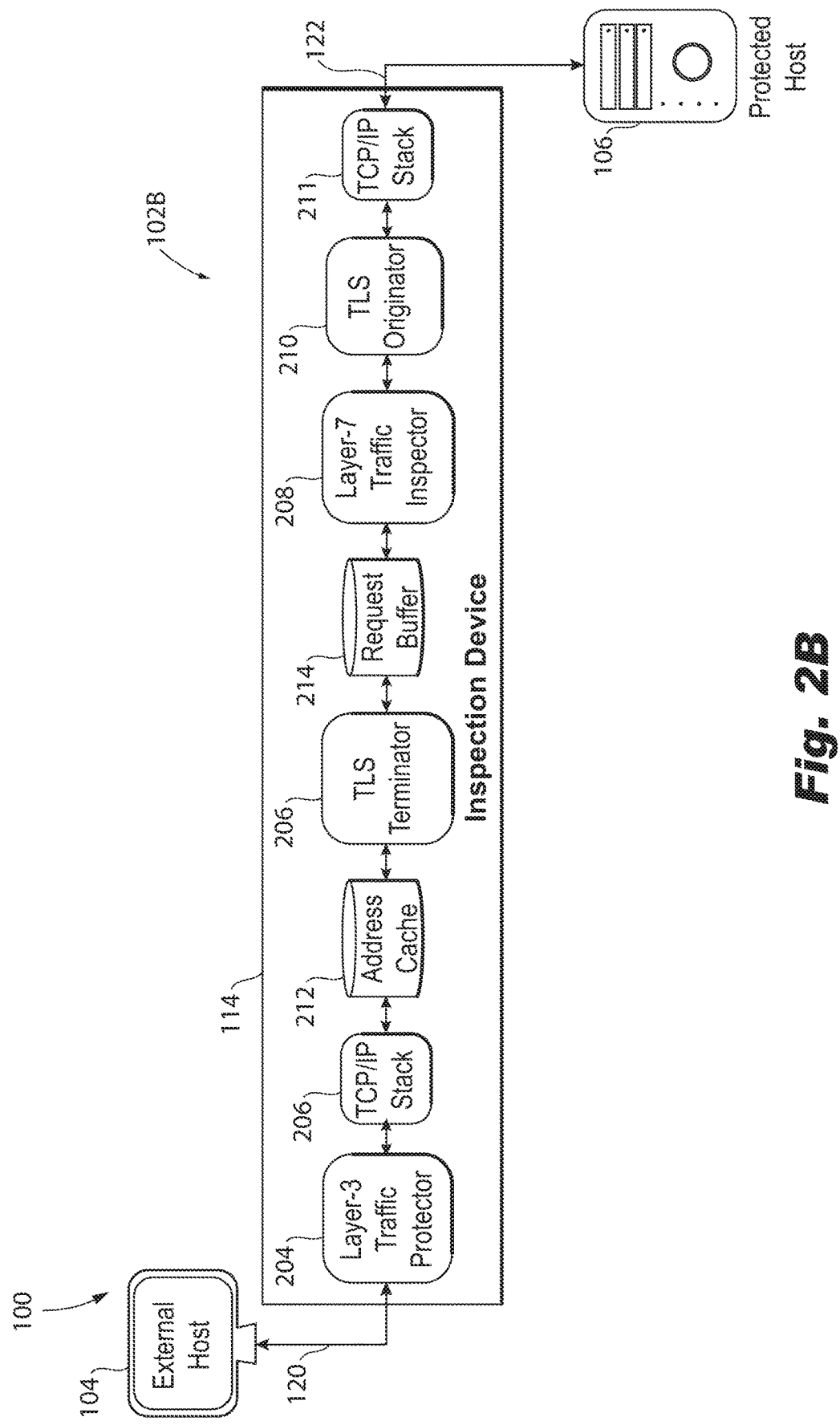
FIG. 2B illustrates a block diagram of the inspection device in accordance with another one or more embodiments of the disclosure.

With reference to FIG. 2B, a block diagram of network system 100 is shown with inspection device 102B, wherein inspection device 102B includes the structure and function of inspection device 102 in accordance with one or more embodiments of the disclosure. The external hosts 104, external network 108, protected hosts 106, protected network 110, external communication links 120, and internal communication links 122 are functionally and structurally similar to the description provided with respect to FIG. 1, and is not repeated here for the sake of brevity.

Inspection device 102B includes components, including a Layer-3 traffic protector 204, first TCP/IP stack 205, TLS terminator 206, Layer-7 traffic inspector 208, TLS originator 210, second TCP/IP stack 211, address cache 212, and request buffer 214, which operate together to provide a routing solution for inspection device 102B.

Layer-3 traffic protector 204 provides Layer-3 inspection and drops traffic that does not pass this inspection. The Layer-3 inspection can include, for example, a source blacklist and/or whitelist, a geo-location blacklist and/or whitelist, source request rate-limiting, and/or source request time-out.

The TCP/IP stack 205 performs TCP handshaking (e.g., a three-way handshake) with an external host 104 and obtains the source and destination data from a third TCP handshake packet of the TCP handshake. This is different from inspection device 102A, in which the TCP/IP stack 205 obtains the source and destination data from the first TCP handshake packet (TCP SYN) of the TCP handshake.

The three-way TCP handshake can be used to protect from the possibility of spoofed TCP SYN messages. Instead of using a TCP SYN message for address information, a TCP ACK message is used to populate the address cache 212 as follows. An incoming TCP SYN message is received from an external host 104 for a new TLS termination connection with the external host 104. A timer is started for this connection. As a challenge, a TCP SYN+ACK message is sent to the source address (which is the address of the external host 104 of the initial TCP SYN message. Upon receipt of an incoming TCP ACK message, the timer is stopped. If the source address of the TCP ACK message matches the source address of the initial TCP SYN message, address cache 212 is updated by caching the source address.

If the source address of the TCP ACK message does not match the source address of the initial TCP SYN message, this is an indication that the external host 104 that sent the TCP SYN is a suspicious entity, e.g., a non-legitimate or malicious entity. When this occurs, the TCP SYN message is dropped and the connection established by the TCP SYN message received from the external host 106 is reset.

Another situation that indicates the external host 104 that sent the TCP SYN is suspicious a suspicious entity is when the timer exceeds a threshold amount of time (also referred to as the timer fires) before a TCP ACK packet is received. In this situation as well, the TCP SYN message is dropped and the connection established by the TCP SYN message received from the external host 106 is reset.

Once the external host 104 is authenticated, TLS terminator 206 performs TLS handshaking and termination as described with respect to inspection device 102A of FIG. 2A. Layer-7 traffic inspector 208, TLS originator 210, and second TCP/IP stack 211 further perform their respective functions as described with respect to inspection device 102A of FIG. 2A.

Figure 3:
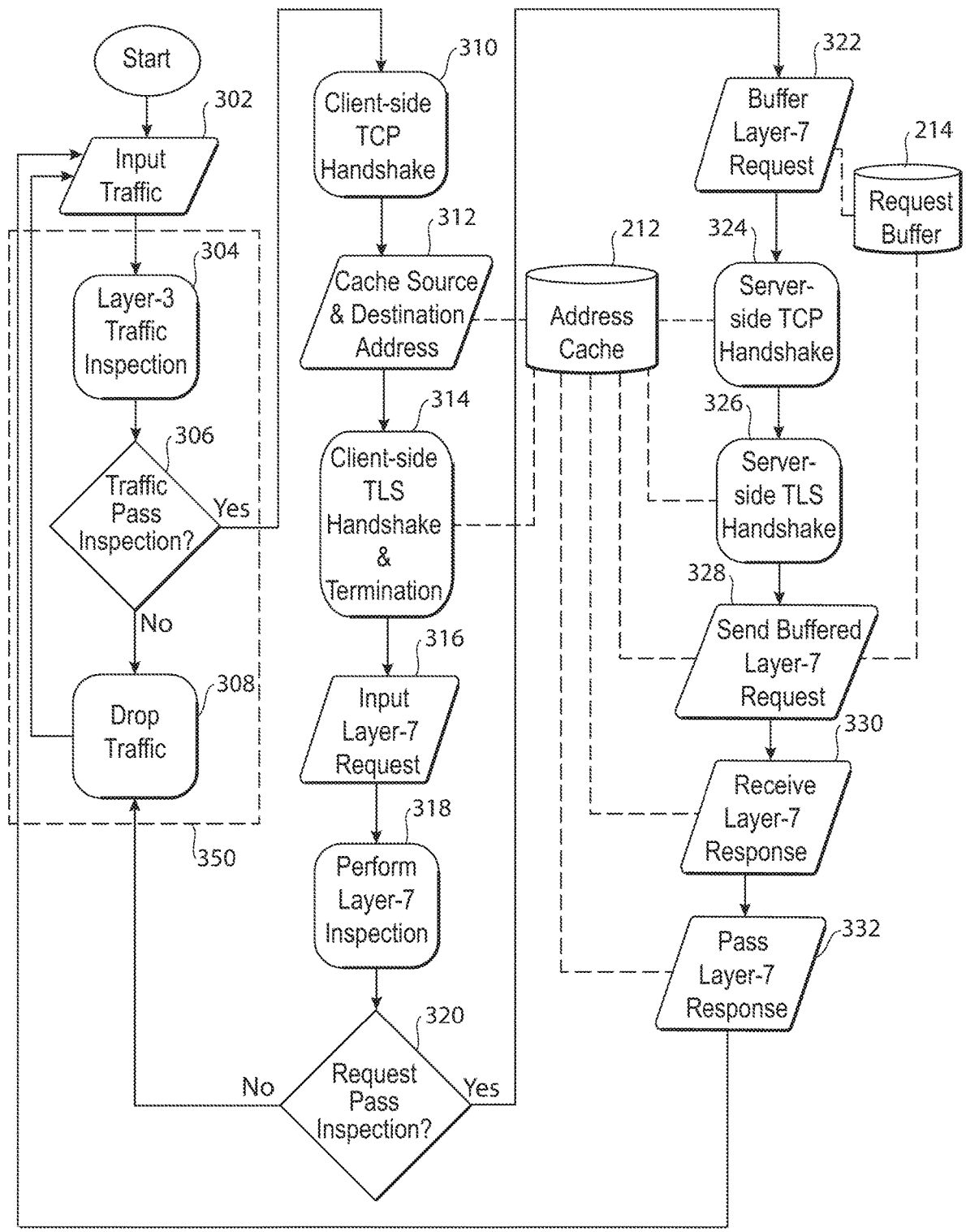
FIG. 3 is an example flowchart showing an example method performed by the inspection device shown in FIG. 1, in accordance with an aspect of the disclosure.

With reference now to FIG. 3, shown is a flowchart demonstrating implementation of the various exemplary embodiments. It is noted that the order of operations shown in FIG. 3 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 3 shows a flowchart of operations performed by an inspection device, such as inspection device 102 shown in FIG. 1 or inspection device 102 shown in FIG. 1 (including embodiment(s) of inspection device 102A shown in FIG. 2A or embodiment(s) of inspection device 102B shown in FIG. 2B. Encrypted and decrypted network traffic is shown by solid and dotted lines, respectively. At operation 302, network traffic is received from an external host, such as one of external hosts 104. At block 304, Layer-3 inspection is performed to the received network traffic. At block 306, a determination is made whether the Layer-3 inspection performed at block 304 was passed. If the determination at block 306 is that the Layer-3 inspection did not pass, the method continues at block 308.

At block 308, the received network traffic is dropped, and the method continues at block 302 for receiving network traffic. At block 310, a TCP handshake is performed with the external host. The TCP handshake can be a three-way handshake in order to provide protection at the transport layer, which is Layer-4 of the OSI layers, or an equivalent to Layer-4 of a different model. Furthermore, the TCP handshake can timeout if not completed within a predetermined time interval. Although not shown in FIG. 3, in one or more embodiments, if the TCP handshake fails, e.g., due to a suspicious source address or occurrence of a timeout, the received network traffic can be dropped at block 308.

At operation 312, source and destination data is cached in address cache 212. The source and destination data includes at least one of source and destination link and internet addresses obtained during the TCP handshake with the external host. In the embodiment(s) described with respect to inspection device 2A of FIG. 2A, the source and destination data is obtained from the first packet of the TCP handshake. In the embodiment(s) described with respect to inspection device 2B of FIG. 2B, the source and destination data is obtained from the third packet of the TCP handshake, which is in response to a challenge by the inspection device. This challenge can provide further protection from malicious entities. If the response does not satisfy a predetermined condition, the TCP handshake can fail, causing the received network traffic to be dropped at block 308.

At block 314, a TLS handshake and termination are performed with the external client. At block 316, a Layer-7 request is received from the external host and the Layer-7 request is decrypted. At block 318, an inspection is performed to the decrypted Layer-7 request. At operation 320, a determination is made whether the Layer-7 request passed the inspection performed at block 318. If the determination is NO, meaning the Layer-7 request did not pass the inspection performed at block 318, the method continues at block 308 for dropping the network traffic that was received. If the determination is YES, meaning the Layer-7 request did pass the inspection performed at block 318, the method continues at block 322.

At block 322, the Layer-7 request is buffered in the request buffer. At block 324, TCP handshaking is performed with a protected host that is addressed by the received network traffic, such as one of protected hosts 106. At block 326, TLS handshaking is performed with the protected host. At block 328, the Layer-7 request that was buffered in address buffer 214 is sent to the protected host. At block 330, a Layer-7 response to the Layer-7 request is received from the protected host. At block 332 the Layer-7 response is passed to the external host, and the method resumes operation at block 302.

As indicated by the dotted lines from address cache 212, blocks 314, 324, 326, 328, 330, and 332 all use the source and destination data that was encrypted and cached in address cache 212. Each of blocks 314, 324, 326, 328, 330, and 332 have the capability to decrypt the source and destination data, upon which the information can be used to perform the designated function of the corresponding block.

With reference to dotted box 350, blocks 304, 306, and 308 included in dotted box 350 are included in the method performed by inspection device 102B shown in FIG. 2B, whereas the blocks in dotted box 350 are not included in the method performed by inspection device 102A shown in FIG. 2A, which can be described as a naïve embodiment of the inspection device.

Figure 4:
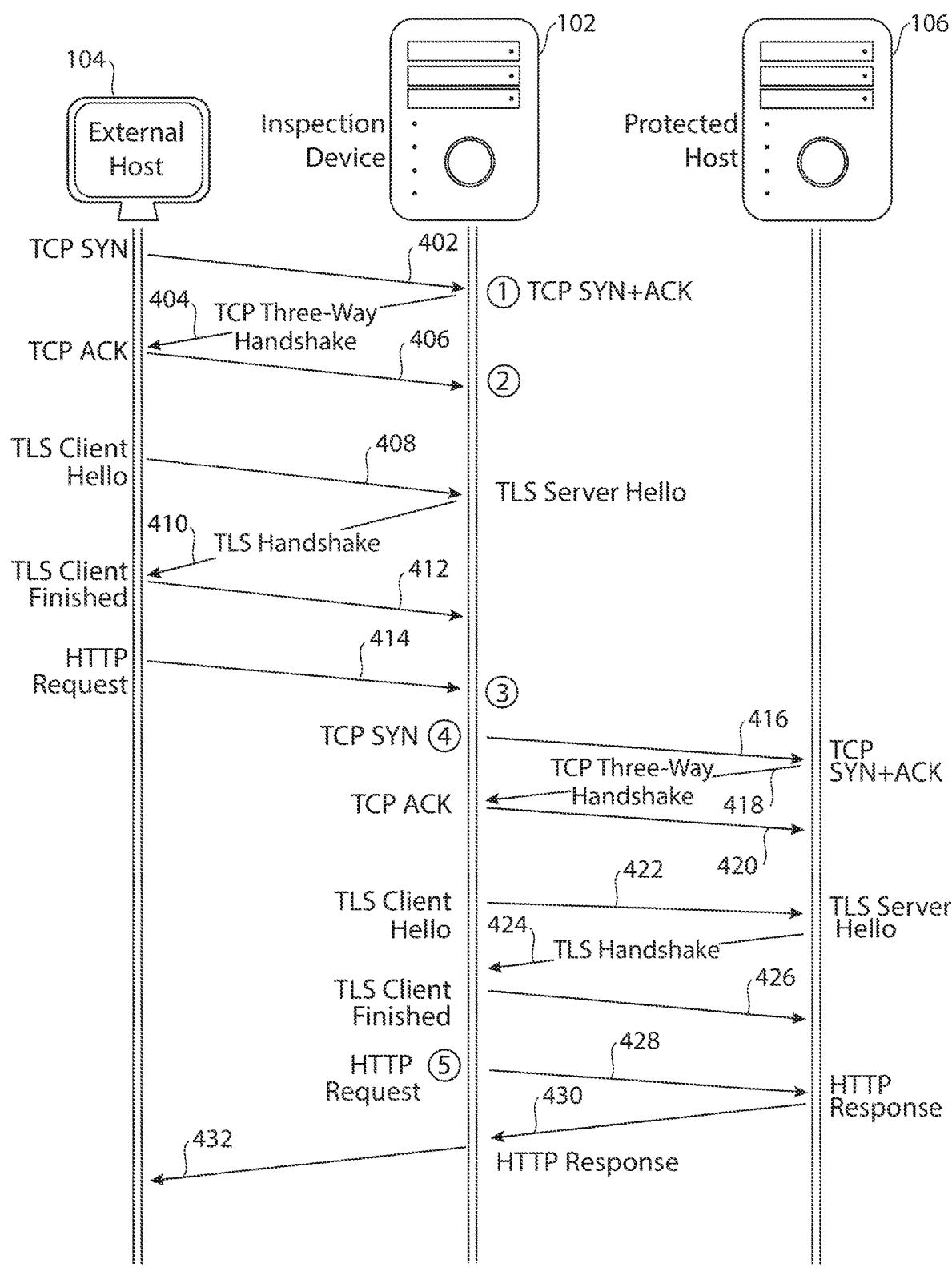
FIG. 4 is an example communication diagram showing exchange of messages between a protected host, an external host and the inspection device shown in FIG. 2B, in accordance with an aspect of the disclosure.

With reference to FIG. 4, a communication diagram is shown that illustrates example flows of communication between an external host 104, inspection device 102 (including embodiment(s) of inspection device 102A shown in FIG. 2A or embodiment(s) of inspection device 102B shown in FIG. 2B), and a protected host 106. The term "flow" as used with respect to FIG. 4 refers to a transmission of data between two entities of the external host 104, inspection device 102, and a protected host 106. At communication flow 402, a TCP SYN message is sent from external host 104 to the protected host 106 and intercepted by inspection device 102, wherein the TCP SYN message is part of a TCP handshake. At communication flow 404, a TCP SYN+ACK message is sent from the inspection device 102 to the external host 104 as part of a TCP handshake. At communication flow 406, a TCP ACK message is sent from external host 104 and intercepted by inspection device 102 as part of the TCP handshake.

Following the TCP handshake, at communication flow 408, external host 104 sends a TLS client hello message as part of a TLS handshake, wherein communication flow 408 is intercepted by inspection device 102. At communication flow 410, inspection device 102 sends a TLS server hello message as part of the TLS handshake. At communication flow 412, external host 104 sends a TLS client finished message to finish the TLS handshake.

Following the TLS handshake, at communication flow 414, external host 104 sends a Layer-7 (e.g., HTTP) request, which is intercepted by inspection device 102. Inspection device 102 buffers the Layer-7 request (as shown in FIG. 3).

At communication flow 416, inspection device 102 sends a TCP SYN message to internal host 106, wherein the TCP SYN message is part of a second TCP handshake. At communication flow 418, a TCP SYN+ACK message is sent from the protected host 106 to inspection device 102 as part of the second TCP handshake. At communication flow 420, a TCP ACK message is sent from protected host 106 to inspection device 102 as part of the second TCP handshake.

Following the second TCP handshake, at communication flow 422, inspection device 102 sends a TLS client hello message to protected host 106 as part of a second TLS handshake. At communication flow 424, protected host 106 sends a TLS server hello message to inspection device 102 as part of the second TLS handshake. At communication flow 426, inspection device 102 sends a TLS client finished message to finish the second TLS handshake.

Following the second TLS handshake, at communication flow 428, inspection device 102 sends the buffered Layer-7 (e.g., HTTP) request to protected host 106. At communication flow 430, protected host 106 responds to the Layer-7 request to inspection device 102 with a Layer-7 (e.g., HTTP) response. At communication flow 432, inspection device 102 passes the Layer-7 response to the external host 104.

While caching of the source and destination data and buffering of the Layer-7 request are not part of the communications shown in the communication diagram 400, these are processes that take place behind the scenes of communication diagram 400, and the data cached in the address cache 212 and the Layer-7 address buffered in the address buffer 214 are accessed by the inspection device 102 to perform its functions.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of inspection device 102 (including the embodiments of inspection devices 102A and 102B) may be implemented or executed by one or more computer systems. For example, inspection device 102 can be implemented using a computer system such as example computer system 500 illustrated in FIG. 5. In various embodiments, computer system 500 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types. Computer system 500 may be practiced in distributed data processing environments where tasks are performed by remote processing devices that are linked through a communications network. In a distributed data processing environment, program modules may be located in both local and remote computer system storage media including memory storage devices.

Figure 5:
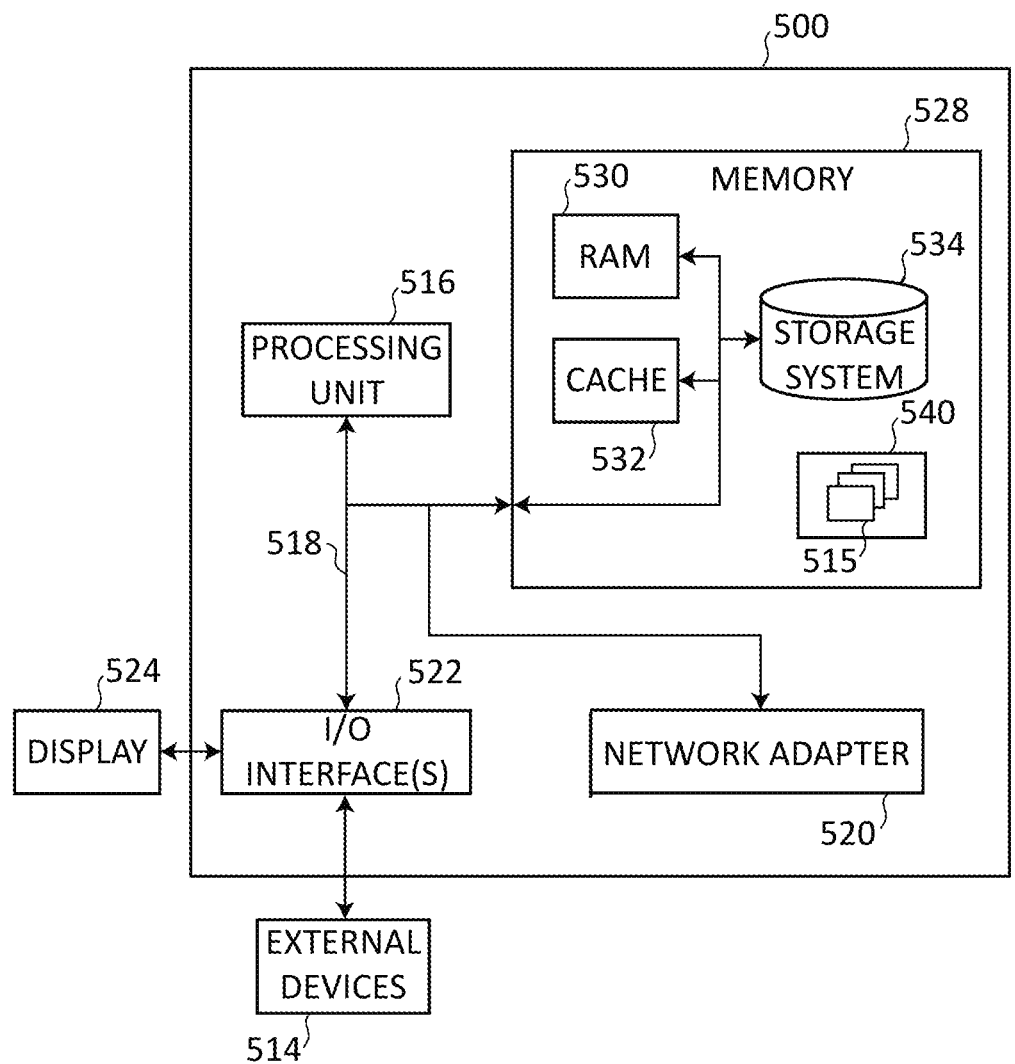
FIG. 5 illustrates an example computing system that could be used to implement the inspection device shown in FIG. 1, in accordance with an aspect of the disclosure.

Computer system 500 is shown in FIG. 5 in the form of a general-purpose computing device. The components of computer system 500 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 500 typically includes a variety of computer system readable media. Such media may be any available media that is accessible by computer system 500, and it includes both volatile and non-volatile media, removable and non-removable media.

System memory 528 can include computer system readable media in the form of volatile memory, such as random access memory (RAM) 530 and/or cache memory 532. Computer system 500 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515, such as computer system 500, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 500 may also communicate with one or more external devices 514 such as a keyboard, a pointing device, a display 524, etc.; one or more devices that enable a user to interact with computer system 500; and/or any devices (e.g., network card, modem, etc.) that enable inspection device 102 to communicate with one or more other computing devices. Such communication can occur via Input/Output (I/O) interfaces 522. Still yet, computer system 500 can communicate with one or more networks such as a local area network (LAN), a general wide area network (WAN), and/or a public network (e.g., the Internet) via network adapter 520. As depicted, network adapter 520 communicates with the other components of network system 100 via bus 518. It should be understood that although not shown, other hardware and/or software components could be used in conjunction with computer system 500. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method for inspecting network traffic, the method comprising:
   in a single contained device:
   receiving network traffic inbound from an external host that is external to a protected network, the network traffic flowing to a protected host of the protected network and being transported by a secure protocol that implements ephemeral keys that endure for a limited time;
   performing a first transmission control protocol (TCP) handshake with the external host;
   obtaining source and destination data during the first TCP handshake, the source and destination data including source and destination link and internet addresses obtained;
   caching the source and destination data; and using the source and destination data that was cached to obtain a Layer-7 request from the external host to the protected host and to pass a Layer-7 response from the protected host to the external host.

2. The method of claim 1, further comprising:
in the single contained device:
performing a first transport layer security (TLS) handshake with the external host;
validating the Layer-7 request obtained after completing the first TLS;
buffering the Layer-7 request;
performing a second TCP handshake with the protected host;
performing a second TLS handshake with the protected host, contingent on validation of the Layer-7 request;
sending the Layer-7 request that was buffered to the protected host;
receiving the Layer-7 response to the Layer-7 request from the protected host; and
passing the Layer-7 response to the external host,
wherein the source and destination data that was cached is used for at least one of performing the first TLS handshake, performing the second TCP handshake, performing the second TLS handshake, sending the buffered Layer-7 request, receiving the Layer-7 response, and passing the Layer-7 response.

3. The method of claim 2, further comprising inspecting a packet of the network traffic received inbound from the external host by a Layer-3 inspection before performing the first TCP handshake.

4. The method of claim 3, wherein the first TCP handshake is only completed when the packet passes the Layer-3 inspection.

5. The method of claim 2, wherein caching the source and destination data comprises using the source and destination link and internet addresses of an incoming TCP-acknowledgement packet of the TCP handshake.

6. The method of claim 5, wherein the source and destination link and Internet addresses of the incoming TCP acknowledgement packet are cached only if the incoming TCP acknowledgement packet was received within a threshold amount of time of receiving an incoming TCP synchronization packet of the TCP handshake.

7. The method of claim 2, wherein at least one of buffering the Layer-7 request, performing the second TCP handshake, and performing the second TLS handshake is only initiated when the Layer-7 request passes a Layer-7 inspection.

8. A system for inspecting network traffic, the system comprising:
a memory configured to store instructions;
at least one processor in a single contained device, disposed in communication with said memory, wherein instructions upon execution by the at least one processor cause the at least one processor to:
receive network traffic inbound from an external host that is external to a protected network, the network traffic flowing to a protected host of the protected network and being transported by a secure protocol that implements ephemeral keys that endure for a limited time;
perform a first transmission control protocol (TCP) handshake with the external host;
obtain source and destination data during the first TCP handshake, the source and destination data including source and destination link and internet addresses obtained;
cache the source and destination data; and
use the source and destination data that was cached to obtain a Layer-7 request from the external host to the protected host and to pass a Layer-7 response from the protected host to the external host.

9. The system of claim 8, wherein the instructions upon execution by the at least one processor further cause the at least one processor to:
perform a first transport layer security (TLS) handshake with the external host;
validate the Layer-7 request obtained after completing the first TLS;
buffer the Layer-7 request;
perform a second TCP handshake with the protected host;
perform a second TLS handshake with the protected host, contingent on validation of the Layer-7 request;
send the buffered Layer-7 request to the protected host;
receive the Layer-7 response to the Layer-7 request from the protected host; and
pass the Layer-7 response to the external host,
wherein the source and destination data that was cached is used for at least one of performing the first TLS handshake, performing the second TCP handshake, performing the second TLS handshake, sending the buffered Layer-7 request, receiving the Layer-7 response, and passing the Layer-7 response.

10. The method of claim 9, wherein at least one of buffering the Layer-7 request, performing the second TCP handshake, and performing the second TLS handshake is only initiated when the Layer-7 request passes a Layer-7 inspection.

11. The system of claim 8, wherein the instructions upon execution by the at least one processor further cause the at least one processor to inspect a packet of the network traffic received inbound from the external host by a Layer-3 inspection before performing the first TCP handshake.

12. The method of claim 11, wherein the first TCP handshake is only completed when the packet passes the Layer-3 inspection.

13. The system of claim 8, wherein caching the source and destination data comprises using the source and destination link and internet addresses of an incoming TCP acknowledgement packet of the TCP handshake.

14. The system of claim 13, wherein the source and destination link and internet addresses of the incoming TCP acknowledgment packet are cached only if the incoming TCP acknowledgement packet was received within a threshold amount of time of receiving an incoming TCP synchronization packet of the TCP handshake.

15. A non-transitory computer readable storage medium and one or more computer programs embedded therein, the computer programs comprising instructions, which when executed by a computer system, cause the computer system to:
receive network traffic inbound from an external host that is external to a protected network, the network traffic flowing to a protected host of the protected network and being transported by a secure protocol that implements ephemeral keys that endure for a limited time;
perform a first transmission control protocol (TCP) handshake with the external host;
obtain source and destination data during the first TCP handshake, the source and destination data including source and destination link and internet addresses obtained;
cache the source and destination data; and
use the source and destination data that was cached to obtain a Layer-7 request from the external host to the protected host and to pass a Layer-7 response from the protected host to the external host.

\* \* \* \* \*